United States Patent [19]
Weeks et al.

[11] Patent Number: 5,518,024
[45] Date of Patent: May 21, 1996

[54] OVERFILL PREVENTION DEVICE FOR STORAGE TANKS

[75] Inventors: Francis B. Weeks; George R. Cockram, both of Apex, N.C.

[73] Assignee: Emco Wheaton, Inc., Wilson, N.C.

[21] Appl. No.: 483,539

[22] Filed: Jun. 7, 1995

[51] Int. Cl.⁶ .................... F16K 31/20; F16K 1/18; F16K 33/00
[52] U.S. Cl. .................... 137/420; 33/726; 73/290 R; 116/227; 141/95; 141/198; 137/423; 137/428; 137/429; 137/448; 137/628; 137/629; 137/630
[58] Field of Search ................ 33/726; 116/227; 138/37, 39; 141/83, 94, 95, 198, 212, 213, 216, 229; 137/315, 409, 420, 423, 428, 429, 448, 551, 627, 628, 629, 630; 73/290 R, 291, 311; 251/73, 127

[56] References Cited

U.S. PATENT DOCUMENTS

| | | | |
|---|---|---|---|
| 1,705,633 | 3/1929 | Bertschinger | 73/290 R |
| 2,194,501 | 3/1940 | Hooper et al. | 141/95 |
| 2,507,545 | 5/1950 | Samiran | 141/213 |
| 4,986,320 | 1/1991 | Kesterman et al. | 141/198 |
| 4,998,571 | 3/1991 | Blue et al. | 141/198 |
| 5,010,915 | 4/1991 | Johnson et al. | 137/423 |
| 5,027,870 | 7/1991 | Butterfield | 141/198 |
| 5,095,937 | 3/1992 | LeBlanc et al. | 137/423 |
| 5,141,019 | 8/1992 | LeBlanc et al. | 137/423 |
| 5,152,315 | 10/1992 | Lagache | 141/198 |
| 5,174,345 | 12/1992 | Kesterman et al. | 141/198 |
| 5,241,983 | 9/1993 | Lagache | 141/198 |
| 5,388,622 | 2/1995 | Phillips | 141/198 |
| 5,398,735 | 3/1995 | Lagache | 141/198 |

FOREIGN PATENT DOCUMENTS

| 2304014 | 3/1975 | France . |
|---|---|---|

*Primary Examiner*—George L. Walton
*Attorney, Agent, or Firm*—Bell, Seltzer, Park & Gibson

[57] ABSTRACT

An overfill prevention device for storage tanks includes an elongate tubular housing having a liquid flow passageway. A normally open main valve and a normally closed vapor retaining bleed valve are associated with the fluid passageway. Closure of the main valve interrupts the primary flow of liquid through the passageway and closure of the bleed valve prevents any further liquid from entering the tank and also prevents the escape of vapors from the tank. Operation of the main valve is controlled in significant part by a valve latch assembly which is carried by the housing and a relatch assembly which is carried by the main valve. The relatch assembly ensures operative engagement of the main valve with the valve latch assembly upon movement of the main valve from the intermediate position to the open position. Operation of the main valve and vapor retaining bleed valve is also controlled indirectly by a plurality of floats which are maintained in a float chamber extending adjacent the liquid passageway. Deflecting fins are also provided in the fluid passageway for preventing damage to the main valve when an elongate measuring member such as a gauge pole is inserted into the tank for measuring the level of liquid therein.

12 Claims, 5 Drawing Sheets

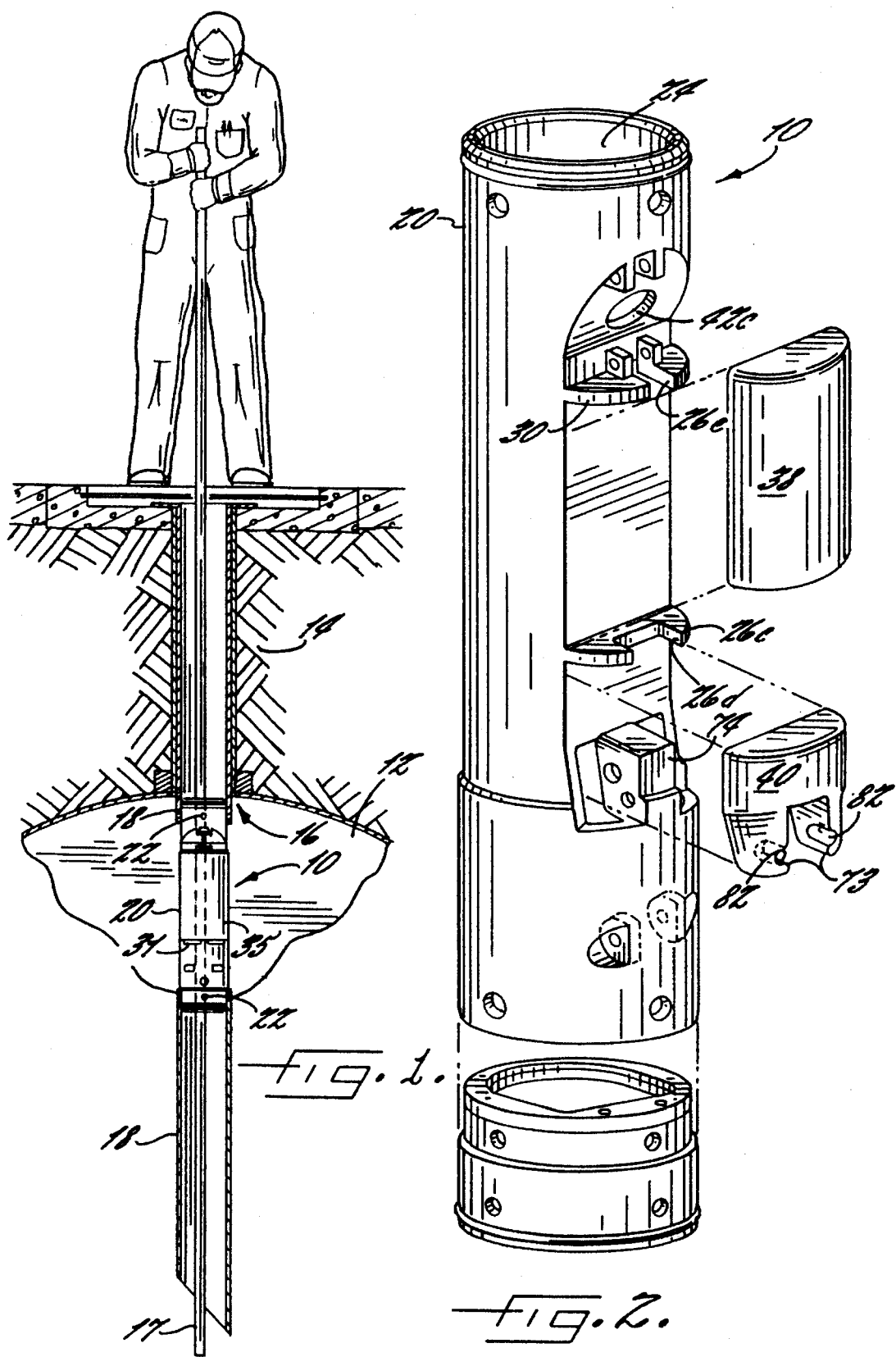

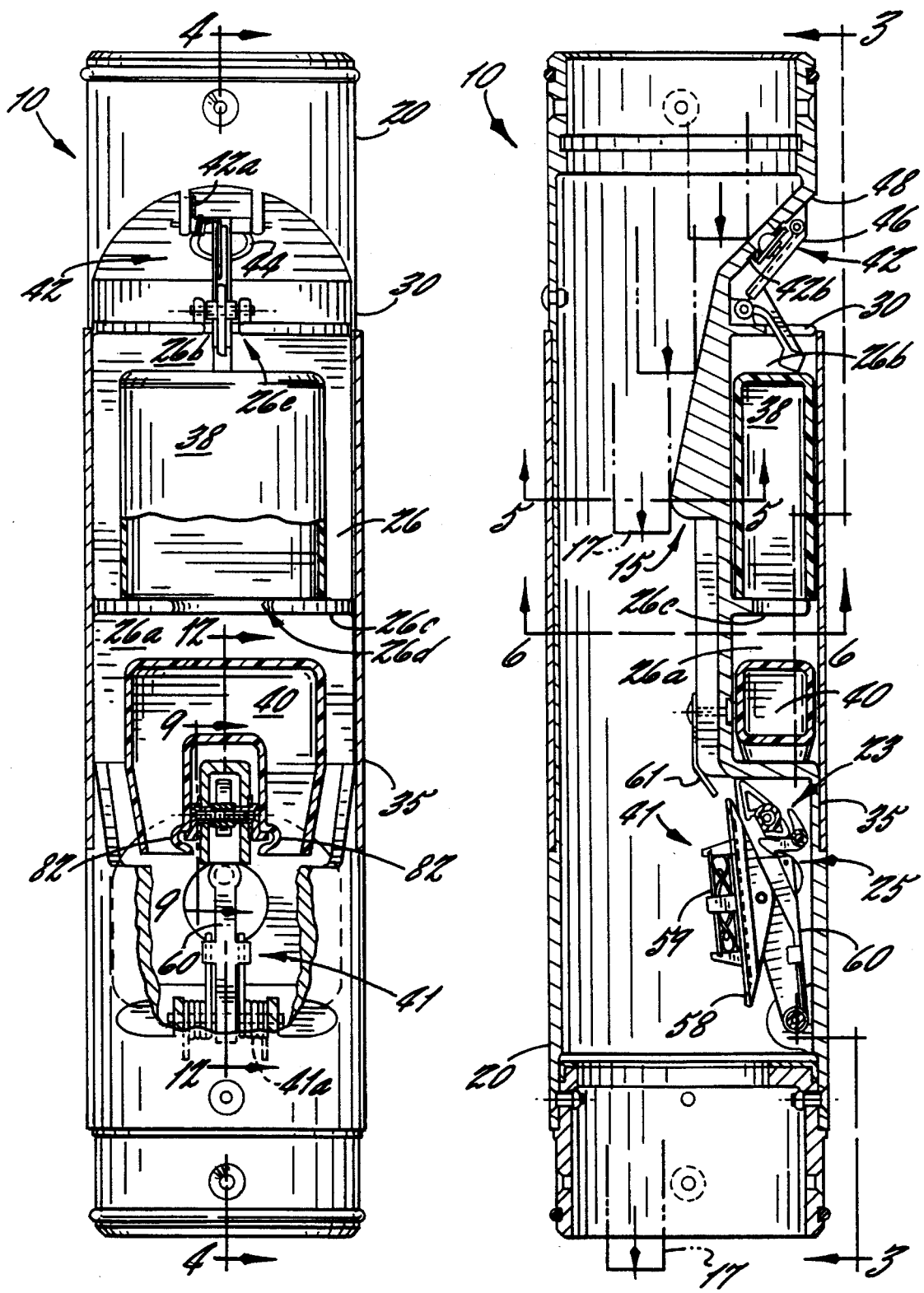

OVERFILL PREVENTION DEVICE FOR STORAGE TANKS

FIELD OF THE INVENTION

This invention relates to devices for preventing overfilling of liquid storage tanks, particularly underground tanks of the type commonly used for the storage of gasoline and similar liquid products.

BACKGROUND OF THE INVENTION

Storage tanks for gasoline and other fuels at service stations are typically buried in the ground and have manifolds which open at ground level. These manifolds are connected to the interior of the storage tanks by fill pipes. These storage tanks are serviced by tanker trucks which have hoses that connect at their outer ends to the manifolds.

The fuel level in the storage tanks is typically monitored by the insertion of a wooden measuring stick or graduated pole through the fill pipe into the storage tank to the bottom thereof. Upon withdrawal of the measuring stick, the wet area of the stick will indicate the level of fuel in the storage tank.

Overfilling storage tanks with gasoline or similar fuels results in spillage of such fuels onto the ground which results in soil and air contamination and possibly other detrimental ecological and other consequences. It has been previously proposed to provide devices for closing the fill pipe of such storage tanks when filled to a preselected level of its maximum capacity. In order to prevent tampering and/or damage from accidental impacts or the like, such overfill prevention devices preferably are located entirely within the tank, in series with the fill pipe or "drop tube."

Retrofit installation of an overfill prevention device within a storage tank therefore requires that the device be sufficiently small, especially in its transverse dimension, as to be capable of passage through the tank's manifold and fill pipe. Some prior overfill prevention devices include at least one float that projects laterally from the main body of the device and undergoes arcuate pivotal movement in response to changes in the liquid level within the tank. Devices having the float and associated linkage components permanently projecting laterally from the housing of the device cannot be installed readily, if at all, within existing tanks since they will not pass through the tank's manifold and/or associated fill pipe. Even those devices having float and linkage components that deploy outwardly from the housing only after passage into the tank will not function properly, if at all, when a side wall or baffle of the tank intersects and obstructs the intended path of pivotal movement of the float. Additionally, and in all cases, the use of long interconnecting linkages between the floats and the components connected thereto significantly increases the cost of the overfill devices, and the risk of component malfunction.

Other overfill prevention devices, such as those disclosed in U.S. Pat. Nos. 5,095,937 and 5,141,019 to LeBlanc et al. and U.S. Pat. No. 5,010,915 to Johnson et al., use pairs of hollow tubular floats to provide two-stage float actuated shutoff. Unfortunately, such devices cannot be used for retrofit applications unless drop tubes having small transverse dimensions are employed therein since both the drop tube and surrounding tubular floats must fit within the fill pipe of the storage tank. The use of drop tubes having small transverse dimension is undesirable because they reduce the rate at which storage tanks can be filled and also complicate measurement of fuel levels therein using conventional gauge poles which must be carefully positioned to fit within the drop tube and overfill device without causing damage thereto.

Another undesirable feature of many overfill devices is that they have bleed ports which permit the introduction, albeit at a slow rate, of an unlimited amount of additional liquid into a tank following closure of the main control valve of the device. Such introduction through the bleed ports fosters overfilling by operators who attempt to dispense as much fuel as possible. Many overfill devices also permit the escape of hazardous vapors from the upper vapor filled portion of the tank to the atmosphere when the fill pipe cover is removed. Many regulatory bodies now prohibit the use of any devices which permit such vapors to escape into the atmosphere.

The overfill prevention device disclosed in the commonly assigned U.S. Pat. No. 5,027,870 to Butterfield, was a successful solution to many of the aforementioned deficiencies and disadvantages of prior overfill prevention devices. However, this prior overfill prevention device had certain disadvantages and deficiencies. Among these disadvantages and deficiencies were the premature unlatching and closure of the main valve by waves in the storage tank during filling and problems with the main valve returning to the fully open and latched position when the main valve float returned to its lower position. Still further, the main valve in the Butterfield overfill prevention device was susceptible to damage by the gauge pole or fuel level measuring stick upon insertion and/or removal thereof from the storage tank.

SUMMARY OF THE INVENTION

With the foregoing in mind, it is an object of the present invention to provide an improved overfill prevention device that is of highly compact, durable and economical construction, that can be easily installed within existing underground gasoline storage tanks, on a retrofit basis, as well as within new storage tanks, and that overcomes the aforementioned disadvantages and deficiencies of prior overfill prevention devices.

This object is achieved by a device which includes an elongate tubular housing that is connected in series with fill piping through which liquid is introduced into the tank. A liquid flow passageway of relatively large transverse dimension extends longitudinally through the housing and communicates with the fill pipe through a liquid inlet and with the storage tank through an outlet. A normally open main valve and a vapor retaining bleed valve are associated with the fluid passageway, preferably at spaced locations along its length. Alternatively, the main valve and vapor retaining bleed valve may be combined in a single assembly at a predetermined position in the fluid passageway. Closure of the main valve interrupts the primary flow of liquid through the passageway, and occurs when the liquid level within the tank reaches a preselected first elevation. Closure of the bleed valve, which occurs when the liquid level reaches a preselected second, higher elevation, prevents any further liquid from entering the tank and also prevents the escape of vapors from the tank. Operation of the main valve and vapor retaining bleed valve is controlled by float means, which preferably comprises a plurality of floats, in conjunction with latch means.

Deflecting means is also provided in the liquid flow passageway for deflecting an elongate measuring member (e.g., gauge pole) away from the main valve upon insertion thereof into the tank. This deflecting means also prevents contact between the measuring member and the main valve during measurement of the liquid level in the tank and when the measuring member is being withdrawn from the tank.

In particular, the overfill prevention device of this invention includes a passageway for liquid flow and a float chamber which extends separate from and adjacent the liquid passageway. A main valve is carried by the housing within the passageway and is movable between a normally open position permitting substantially unrestricted flow of liquid through the passageway, an intermediate position permitting some flow of liquid through said passageway, and a closed position preventing a significant amount of flow of liquid through said passageway.

The float chamber has an inlet adapted to be in fluid communication with the interior of the tank for entry of liquid so that the level of liquid in the float chamber substantially corresponds to the level of liquid in the tank. A float means includes a pair of floats which are contained within the float chamber, preferably one above the other, and move along a substantially linear path of travel in response to changes in the level of liquid in the float chamber. A lowermost float normally occupies a first position when there is no liquid in the float chamber, but is movable to a second position when the level of liquid in the float chamber rises to a predetermined height indicative of the level of liquid in the tank when the tank is considered substantially full. An uppermost float also normally occupies a first position when there is less than a predetermined amount of liquid in the float chamber, but is movable to a second position when the level of liquid in the float chamber rises to a predetermined height indicative of the level of liquid in the tank when the tank is considered full.

A main valve latch means is movable between operative and inoperative positions in response to movement of the first float between the first and second positions. When in the operative position, the main valve latch means is engaged with the main valve and latches the main valve in the open position. When in the inoperative position, the main valve latch means is disengaged from the main valve and releases it for movement to the intermediate position and then to the closed position in response to the downward force caused by liquid flow through the passageway and into the tank.

Relatch means is also provided for ensuring operative engagement of the main valve with the valve latch means upon movement of the main valve from the intermediate position to the open position. The relatch means preferably comprises a pivotable shoulder which is carried by the main valve and is weight balanced to retain a normally engaging position which allows the valve latch means to latch the main valve in the open position. The purpose of the relatch means is to prevent the float means from becoming out of synch with the main valve and preventing the main valve from achieving a fully upright and open position even though the tank is less than substantially full. This can occur, for example, when the first float momentarily shifts to the second position because of wave action in the tank during filling and then drops back to the first position after the main valve has been shut by the downward force caused by the liquid flow.

The deflecting means is also positioned in the passageway, between the main valve and the passageway inlet, in order to deflect an elongate measuring member, such as a gauge pole, away from the main valve upon insertion thereof into the tank. This prevents the main valve from being accidently damaged by insertion of the elongate measuring member. Preferably, the deflecting means also prevents contact between the inserted elongate member and the main valve during measurement of the level of liquid in the tank and also when the elongate member is being withdrawn from the tank. The deflecting means comprises a plurality of sloped fins which are integrally formed with the housing or mounted on an interior sidewall of the housing. The fins are sufficiently spaced to allow the flow of liquid therebetween. Thus, high liquid flow rates into the tank can still be achieved even though the deflecting means is in the liquid flow path.

DESCRIPTION OF THE DRAWINGS

Other features of the invention will be apparent from the following description of an illustrative embodiment thereof, which should be read in conjunction with the accompanying drawings, in which:

FIG. 1 is a vertical sectional view of a portion of a liquid storage tank containing an overfill prevention device in accordance with the invention, taken during manual measurement of a liquid level therein by a service operator;

FIG. 2 is a partially exploded perspective view showing some of the float and adjacent components of the device shown in FIG. 1;

FIG. 3 is a view partially in front elevation and partially in vertical section of the device shown in FIG. 2, taken substantially along the line 3—3 of FIG. 4;

FIG. 4 is an enlarged vertical sectional view of the device, taken approximately along the line 4—4 of FIG. 3;

DESCRIPTION OF THE PREFERRED EMBODIMENT

Figure 5:
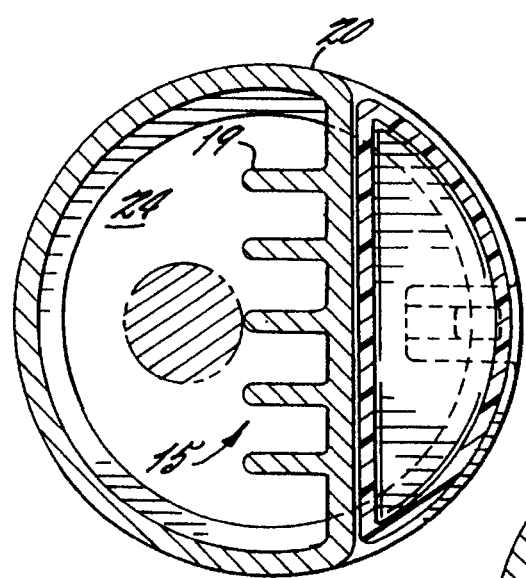
FIG. 5 is a horizontal sectional view of the device, taken substantially along the line 5—5 of FIG. 4.

The numeral 10 in FIG. 1 designates an overfill prevention device that is located within the upper portion of a tank 12, which may be an underground tank such as is commonly used by gasoline service stations for storage of gasoline and similar liquids. Such a tank customarily and illustratively has a fill pipe 14 extending upwardly from an inlet opening 16. A removable "drop tube" 18 extends through the fill pipe 14 and the inlet opening 16, and normally terminates adjacent the bottom of the tank 12. As is well known to those skilled in the art, gasoline or other fuel or liquid would normally be introduced into the tank 12, when required, by a tanker truck having a flexible hose communicating via a suitable coupling or fitting (all not shown) with the fill pipe 14 and the drop tube 18.

The device 10 for preventing overfilling of the tank 12 is connected in series with the drop tube 18 at a preselected elevation within the tank 10. The selected elevation is dependent upon the maximum height which the liquid level within the tank is to reach during each filling operation.

Referring now also to the other FIGS. 2–13, the device 10 includes an elongate tubular housing 2{}, preferably of cylindrical shape. The housing 20 has a diameter approximately the same as that of the drop tube 18, and is secured to and in axial alignment with the drop tube 18 by rivets 22 or other suitable fasteners. A liquid flow passageway 24 extends the entire length of the housing 20 and communicates at its opposite ends with thereto adjacent sections of the drop tube 18. Main valve means 41 and bleed valve means 42 are respectively located adjacent the lower end portion and the upper end portion of the passageway 24 in the preferred embodiment, but may also be combined in a single assembly at a predetermined position in the passageway 24. In the open positions thereof illustrated in FIGS. 3 and 4, the main valve means 41 permits large-volume axial flow of liquid through the lower end of the passageway 24 into the tank 12. In contrast, the bleed valve means 42 permits a much smaller lateral flow of liquid from the upper portion of the passageway 24 into the tank 12 and is spring biased closed against the force of gravity. When means 41 and 42 occupy their closed positions respectively illustrated in FIGS. 8 and 13, no significant amount of liquid passes through the device 10 and into the tank 12.

Figure 12:
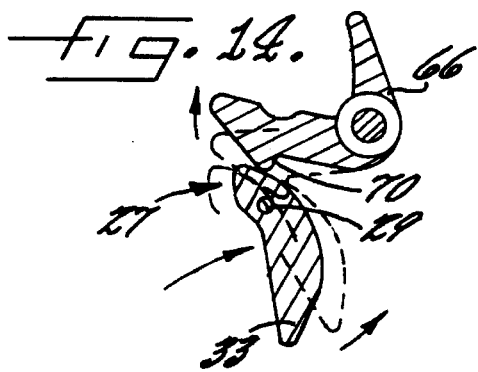
FIG. 12 is a vertical sectional view taken substantially along the line 12—12 of FIG. 3.
Figure 13:
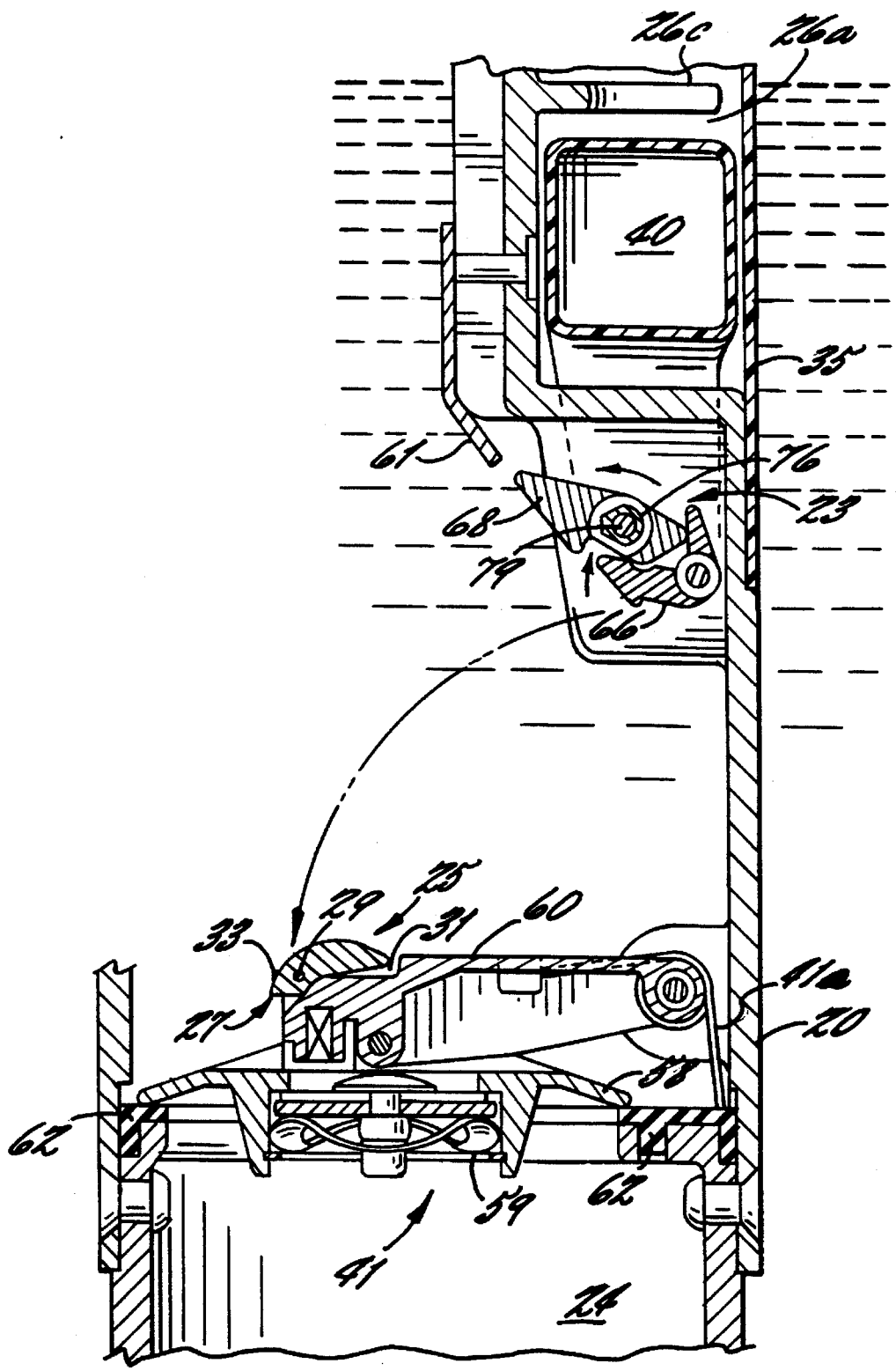
FIG. 13 is a view similar to FIG. 12, but showing the main valve in a closed position.

In particular, the main valve means 41 is carried by the housing 20 within the passageway 24 and is movable between a normally open position maintained by a spring 41a and a closed position as illustrated by FIGS. 12–13, respectively. In moving from the open to closed positions in response to the downward force of liquid flow in the passageway 24, the main valve means 41 passes through a series of intermediate positions illustrated by the arc in FIG. 13. The bleed valve means 42 may also be mounted to the exterior of the housing 20 and is preferably maintained in a normally closed position by a spring 42a which prevents the escape of liquid or fuel vapors from the tank 12 into the drop tube 18 and ultimately to the atmosphere when the fill pipe 14 is opened. A rubber or similar bleed valve seal 42b is also provided to further prevent the escape of vapors. The bleed valve means 42 preferably communicates with the passageway 24 by a bleed port 42c, as illustrated.

The housing 20 also has, intermediate its length, an enclosed float chamber 26 which extends separate from and adjacent the passageway 24. The float chamber 26 is enclosed by a sleeve-like member 35 which may be metal or a durable plastic. The float chamber 26 also has inlet ports 37, as best illustrated in FIG. 1, which are in fluid communication with the interior of the tank 12 for entry of liquid into the float chamber 26 from the tank 12 so that the level of liquid in the float chamber 26 substantially corresponds to the level of liquid in the tank 12. The float chamber 26 is also preferably divided into separate lower and upper chambers 26a–b, containing respective floats, by a dividing wall 26c which has an opening 26d to allow fluid communication between the upper and lower chambers 26a–b. Other aspects of the float chamber 26 are more fully described in the aforementioned U.S. Pat. No. 5,027,870 to Butterfield, the disclosure of which is hereby incorporated herein by reference.

Float means, preferably and illustratively comprising an upper float 38 and a lower float 40 are disposed within the float chamber 26 and are constrained thereby for linear movement, at times in unison with each other and at other times relative to each other, longitudinally of the chamber 26 and substantially parallel to the passageway 24 and the central axis of the housing 20. As viewed in top plan, the floats have a segmental shape complementary to that of the cross-sectional shape of the chamber 26. In order to reduce their mass and simplify their construction, both floats may be and illustratively are open at their lower ends.

Figure 7:
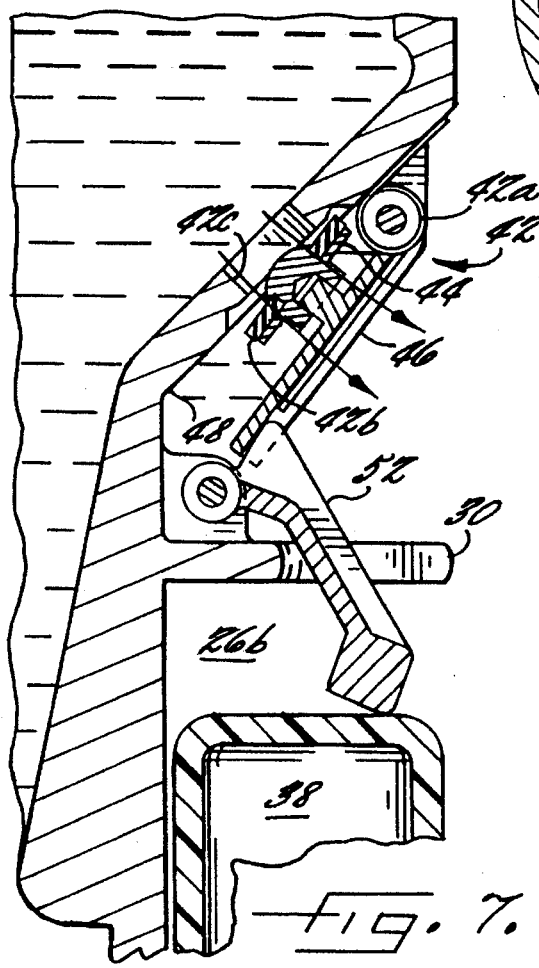
FIG. 7 is an enlarged fragmentary view of the portion of the device shown in the upper portion of FIG. 4 in the position the components occupy before closure of the bleed valve.
Figure 8:
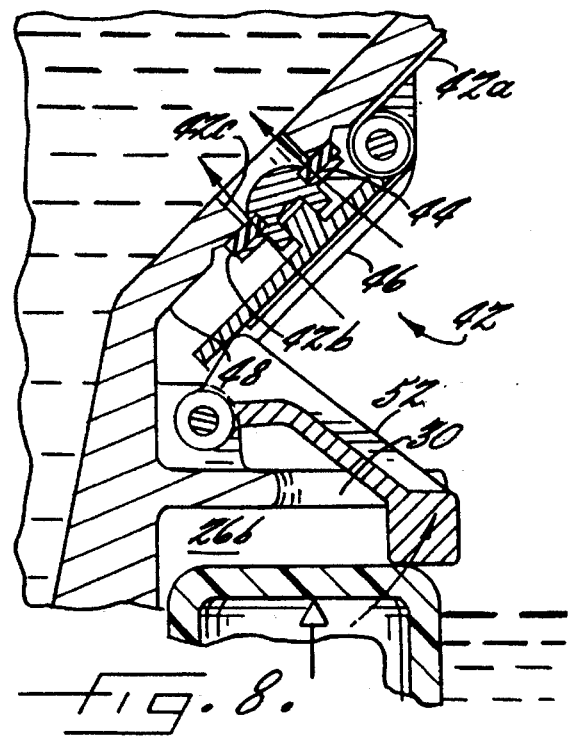
FIG. 8 is a view similar to FIG. 7, but showing float and bleed valve components in a different operational position.
Figure 10:
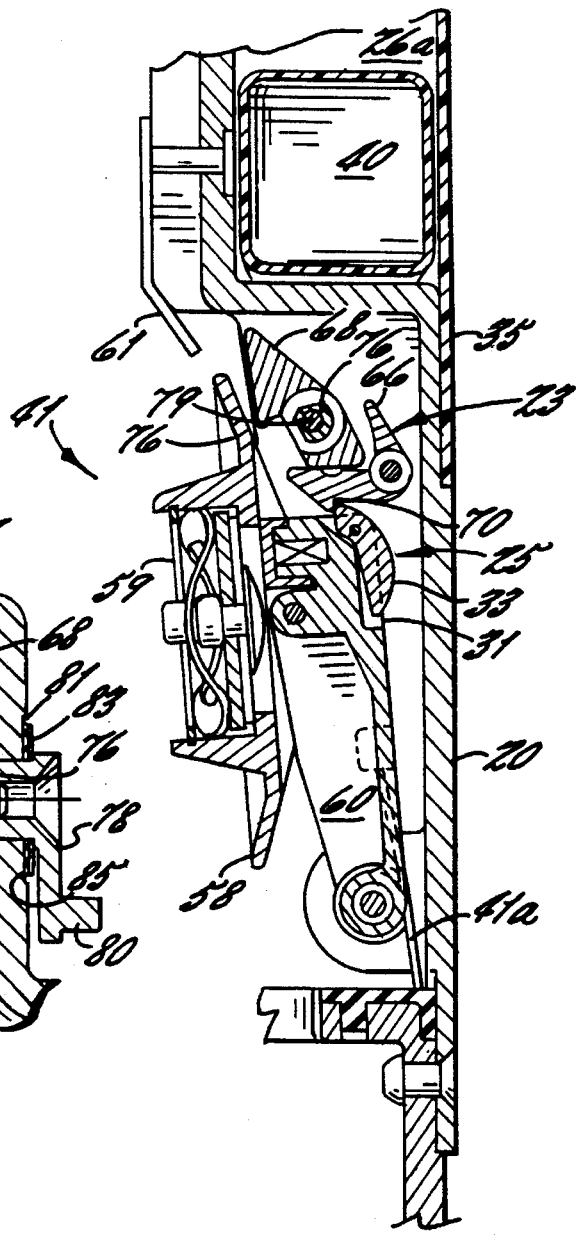
FIG. 10 is an enlarged fragmentary sectional view taken substantially along the line 10—10 of FIG. 9.
Figure 11:
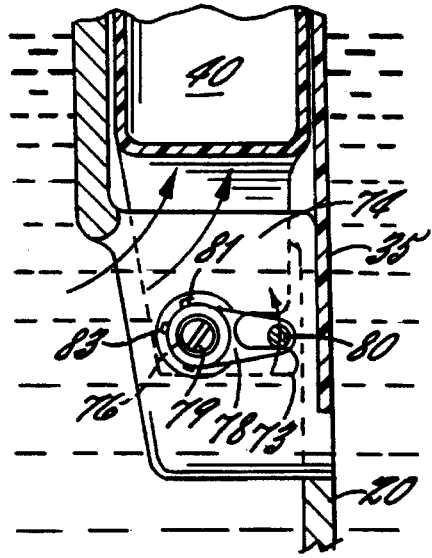
FIG. 11 is a view similar to FIG. 9, but showing the first float displaced upwardly.

Floats 38, 40 constitute part of the control means for controlling operation of the main valve means 41 and the bleed valve means 42 in response to changes in the liquid levels in the tank 12. More specifically, the floats 38, 40 are mounted within the float chamber 26 for movement along a substantially linear path of travel in response to changes in the level of liquid in the float chamber 26. Thus, the lower float 40 occupies a lower first position in the lower float chamber 26a when there is no liquid in the float chamber 26, as illustrated by FIGS. 3, 4 and 10, but occupies an upper second position when the level of liquid in the float chamber 26 rises to a predetermined height indicative of the level of liquid in the tank 12 when the tank 12 is considered substantially full, as illustrated by FIG. 11. Similarly, the upper float 38 occupies a lower first position in the upper float chamber 26b even when the tank 12 is considered substantially full as illustrated by FIG. 7, but occupies an upper second position when the level of liquid in the float chamber 26 rises to a predetermined height indicative of the level of liquid in the tank 12 when the tank is considered full, as illustrated by FIG. 8.

Figure 6:
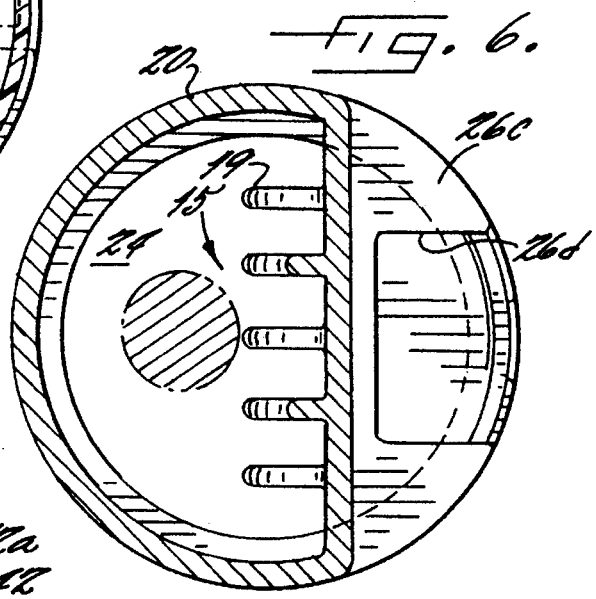
FIG. 6 is a horizontal sectional view of the device, taken substantially along the line 6—6 of FIG. 4.

In a preferred embodiment of the present invention, deflecting means 15 is provided in the passageway 24, between the main valve means 41 and the inlet of the device 10, to deflect an elongate measuring member 17 such as a gauge pole away from the main valve means 41 and a flow directing vane 61 upon insertion thereof into the tank, as illustrated by FIG. 4. This prevents the main valve means 41 from being accidently damaged by insertion of the measuring member 17. Deflecting means 15 also prevents the flow directing vane 61 from potentially damaging (e.g., splintering) the measuring member 17 upon insertion. Preferably, the deflecting means 15 is of sufficient dimension to prevent contact between the inserted measuring member 17 and the main valve means 41 during measurement of the level of liquid in the tank 12 and also when the elongate member is being withdrawn from the tank 12. The deflecting means 15 preferably comprises a plurality of sloped fins 19 which are mounted on an interior sidewall of the housing 20 and are sufficiently spaced to allow the flow of liquid therebetween, as illustrated by FIGS. 4–6. Thus, high liquid flow rates into the tank 12 can still be achieved even though the deflecting means 15 is in the liquid flow path.

Figure 14:
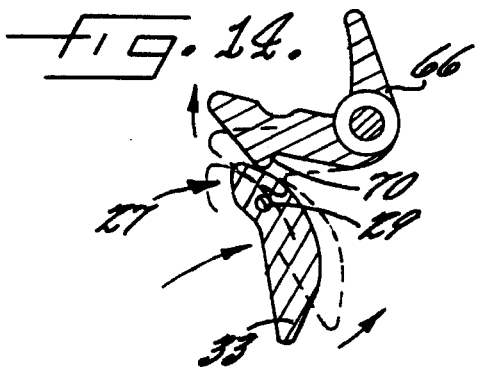
FIG. 14 is an enlarged sectional view showing pivotal displacement of a relatch component relative to a valve latch component, upon movement of the main valve from an intermediate position to the open position.

As illustrated best in FIGS. 12–14, valve latch means 23 is provided for latching the main valve means 41 in the open position during filling of the fuel tank 12 and preventing the main valve means 41 from closing in response to the downward force of liquid flow in the passageway 24. The valve latch means 23 is movable between operative and inoperative positions respectively illustrated in FIGS. 12 and 14, in response to movement of the lower float 40 between the first and second positions. When in the operative position, the valve latch means 23 is engaged with the main valve means 41 and latches the main valve in the open position. When in the inoperative position caused by movement of the lower float 40 to the second position, the valve latch means 23 is disengaged from the main valve means 41 and releases it for movement to the intermediate position and then to the closed position in response to the downward force of liquid flow during filling of the tank 12, as illustrated by FIG. 13.

According to a preferred aspect of the present invention, relatch means 25 is also provided for ensuring operative engagement of the main valve means 41 with the valve latch means 23 upon upward movement of the main valve means 41 from an intermediate position to the fully open position. The relatch means 25 preferably comprises a pivotable shoulder 27 which is carried by the main valve means 41 and is weight balanced to retain a normally engaging position which allows the valve latch means 23 to hold and latch the main valve means 41 in the open position. The purpose of the relatch means 25 is to prevent the lower float 40 from becoming out of synch with the main valve means 41 and thereby preventing the main valve means 41 from achieving a fully upright and open position even when the tank 12 is less than substantially full. This can occur, for example, when the lower float 40 momentarily shifts to the second position because of wave action in the tank 12 during filling and then drops back to the first position after the main valve means 41 has been shut by the downward force caused by liquid flow through the passageway into the tank 12. As illustrated best by FIGS. 12–14, the main valve means 41 contains a groove 31 therein for receiving the relatch means 25. The pivotable shoulder 27 also comprises an arcuate shaped planar member 33 and a pin 29 which extends through the planar member 33 and is securably mounted to opposing sides of the groove 31.

More specific details of the operation of the device 10 will now be described with reference to the drawings. In particular, the bleed valve means 42 is responsive to movement of the upper float 38 and includes a disc-shaped valve element 44 affixed to an upper link 46 pivotally mounted upon an inclined wall 48 of housing 20, as illustrated best by FIGS. 7–8. The inclined wall 48 projects angularly outwardly above a top wall 30 of the float chamber 26, and contains the bleed port 42c. The upper link 46 and valve element 44 are biased by the spring 42a to their normally closed positions, but can become sufficiently spaced from the bleed port 42c during filling of the tank 12 as to permit a relatively small "bleed" flow of liquid from passageway 24 through the port 42c and into the tank 12 when the main valve means 41 is closed. The bleed valve means 42 also includes a lower link 52 pivotally mounted upon the top wall 30 of the float chamber 26. The inner end portion of the lower link 52 underlies and engages the outer end portion of upper link 46. The outer end portion of the lower link 52 projects into the upper float chamber 26b through an opening 26e within the chamber's top wall 30. The lower link 52 normally occupies and is biased by gravity to its position illustrated in FIG. 7. Upward buoyant movement of the upper float 38 within the float chamber 26 effects engagement of the float's top surface with the outer end of the lower link 52. As illustrated in FIG. 8, further upward movement of upper float 38 then displaces the lower link 52 to a position wherein it pivots the upper link 46 upwardly to force the valve element 44 against the bleed port 42c. This action shuts off the "bleed" flow of liquid into the tank 12 and prevents the tank 12 from being overfilled. This action also causes the bleed valve seal 42b to become compressed around the circumference of the bleed port 42c.

As described above, the lower float 40 is also part of the float means for controlling operation of main valve means 41 which includes an assembly of components. As illustrated best by FIGS. 3, 4 and 12, such assembly includes a valve plate member 58 having a spring-loaded pressure-relief valve 59 within its central portion. Valve plate member 58 is pivotally mounted upon a pivotally movable lever arm 60 for movement between an upwardly extending open position, illustrated in FIGS. 4 and 12, and a generally horizontally extending closed position illustrated in FIG. 13. In its open position, valve plate member 58 is adjacent a flow directing vane 61, and permits substantially free flow of liquid from the lower end of passageway 24 into the tank 12. In its closed position, member 58 engages a seat 62 within the lower portion of passageway 24 and prevents flow of liquid from the lower end, except for an insignificant flow such as that which would ensue upon temporary opening of pressure relief valve 59 in response to a downwardly directed pressure pulse upon the valve plate member 58.

Valve plate member 58 and its support arm 60 are biased to their open positions by a torsion spring 41a engaging arm 60. However, during filling of tank 12, the valve plate member 58 and the arm 60 are also biased in the opposite direction, toward their closed position, by the force then imposed upon the upper side of the valve plate member 58 by the liquid adjacent to and upstream of the valve means 41. When the "head" of such liquid directed onto the valve plate member 58 by the vane 61 is large, the liquid force will be greater than the force of spring 41a. This will then drive the valve plate member 58 and the arm 60 to their FIG. 13 positions, when they are free to undergo such movement.

However, movement of the valve plate member 58 and the arm 60 to their FIG. 13 positions is prevented except at desired times, by the valve latch means 23. The valve latch means 23 preferably includes pivotally movable latch and catch members 66, 68 that releasably secure members 58 and 60 in their FIG. 12 positions. In their engaged position illustrated in FIG. 12, a downwardly projecting shoulder 70 upon the undersurface of the generally horizontally extending main body of the latch member 66 engages the upstanding and pivotable shoulder 27 of the relatch means 25. The adjacent undersurface of the catch member 68 then extends in generally parallel, abutting relationship to the notched upper surface of the main body of the latch 66 member. This prevents the latch member 66 from undergoing pivotal movement sufficient to terminate the abutting relationship between shoulders 70 and 27. Such disengagement would otherwise automatically occur when the force exerted upon valve plate member 58 and the arm 60 by upstream liquid exceeds the counterforce imposed upon such members by the torsion spring 41a. FIG. 13 shows the latch and catch members 66 and 68 in their disengaged positions. In particular, pivotal movement of the catch member 68 has so displaced its undersurface relative to the notched upper surface of the main body portion of latch 66 as to permit the slight amount of pivotal latch movement necessary for the shoulder 27 upon arm 60 to upwardly displace catch shoulder 70 and move out of engagement therewith, and to thus allow the upstream fluid to move the valve plate member 58 and the arm 60 to their FIG. 13 positions. At such time as the force imposed upon the aforesaid components by the upstream fluid becomes less than the force imposed by torsion spring 41a, as a result of a reduction in the quantity of the upstream liquid, spring 41a will again return the valve plate member 58 and the arm 60 to their FIG. 12 positions.

The lower float 40 within the float chamber 26 causes the catch member 68 to undergo the pivotal movement necessary for it and the latch member 66 to function in the above-described manner. The lower portion of the float 40 is bifurcated so as to possess depending legs 73 that straddle a hollow pillar-like housing 74 extending upwardly from a bottom wall of the float chamber 26. Opposing latch pins 76 which are matingly engaged to the catch member 68 and about whose central axis the catch member 68 pivots, extend laterally through a suitable bore of the housing 74, as illustrated by FIG. 10. Arms 78, which are preferably integral with a corresponding latch pin 76 as illustrated, extend on opposite sides of the housing 74. The arms 78 and latch pins are held together with the catch member 68 using a screw 79. A pair of vapor seals 81 are also provided to prevent the escape of fuel vapors from within the tank 12 to the housing's bore and then to the passageway 24 when the fuel level within the tank 12 drops below the inlet ports 37.

As illustrated best by FIG. 10, the vapor seals 81 are held by respective latch pins 76 and sit within annular recesses 85 on opposite sides of the housing 74. Accordingly, the vapor seals 81 rotate about the central axis of the latch pins 76 and in unison therewith upon movement of the lower float 40. To provide free movement of the lower float 40 in response to changes in the liquid level in the tank 12, the vapor seals 81 preferably have an arcuate cross-section or an arcuate or similarly sloped face opposite the recesses 85 so that the contact area between the recesses 85 and the seals 81 is limited to the outer circumference of the seals 81 when the pressures in the passageway 24 and the tank 12 are at or near equilibrium. This causes the frictional drag between the vapor seals 81 and the recesses 85 to be relatively small and thereby allows free rotation of the latch pins about their central axis while simultaneously providing a vapor seal. Because of the shape of the seals 81, the contact area is also adjustable upward to provide a tighter vapor seal in the event the pressure differential between the upper portion of the tank 12 and the passageway 24 increases. Retaining rings 83 having outer radially extending tabs are also preferably provided to prevent the vapor seals 81 from inverting when the pressure in the passageway 24 is higher than the pressure in the tank 12, such as during refilling of the tank 12.

Figure 9:
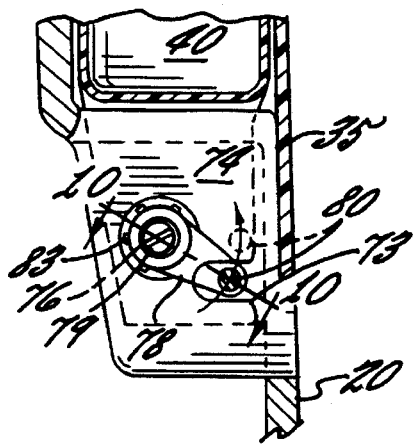
FIG. 9 is a fragmentary side vertical sectional view taken substantially along the line 9—9 of FIG. 3.

Studs 80 upon the ends of the arms 78 project into slots 82 within the inner faces the depending legs 73 of the lower float 40. By virtue of the foregoing connection therebetween, upward movement of the lower float 40 from the bottom wall of the float chamber 26 pivots the arms 78 upwardly, as indicated in FIGS. 9 and 11. This in turn pivots the catch member 68 from its position of FIG. 12 to its position of FIG. 13, and frees the latch member 66 for the slight upward pivotal movement necessary for release of the arm 60 and the valve plate member 58 of the main valve means 41. When the liquid level within tank 12 descends and sufficiently reduces the "head" of the upstream liquid, the torsion spring 41a returns the arm 60 and the valve plate member 58 to their FIG. 12 position and downward movement of the lower float 40 back to the bottom of the float chamber 26 causes pivotal movement of the catch member 68 back to its original position.

While a preferred embodiment of the invention has been specifically shown and described, this was for purposes of illustration only, and not for purposes of limitation, the scope of the invention being in accordance with the following claims.

That which is claimed is:

1. An overfill prevention device adapted to be mounted within a liquid storage tank in fluid communication with piping through which liquid is introduced into the tank, comprising:

an elongate housing having a liquid flow passageway extending longitudinally therethrough, a liquid inlet adjacent one end of said housing and communicating with said passageway, and a primary liquid outlet adjacent the other end of said passageway and adapted to be communicatively connected to the interior of the tank for passing liquid therethrough from said passageway into the tank, said housing including, a float chamber separate from and adjacent said passageway, said float chamber having; an inlet adapted to be in fluid communication with the interior of the tank for entry of liquid into said float chamber from the tank so that the level of liquid in said float chamber substantially corresponds to the level of liquid in the tank;

main valve means carried by said housing within said passageway and movable between a normally open position permitting substantially unrestricted flow of liquid through said passageway and a closed position preventing substantially the flow of liquid through said passageway, said main valve means having biasing means for moving said main valve means from said closed position to said open position when a volume of liquid within said passageway is reduced by a lowering of liquid within the tank, thereby permitting said biasing means to overcome the reduced volume of liquid within said passageway and dispose said main valve means in said open position;

float means mounted within said float chamber for movement along a substantially linear path of travel in response to changes in the level of liquid in said float chamber, said float means normally occupying a first position when there is no liquid in said float chamber and being movable to a second position when the level of liquid in said float chamber rises to a predetermined height indicative of the level of liquid in the tank when the tank is considered substantially full; and a valve latch mechanism comprising first latch means and second latch means cooperatively engageable with said first latch means when said main valve means is in said open position, said first latch means being movable between operative and inoperative positions and responsive to movement of said float means between said first and second positions and when in said operative position being engageable with said main valve means for latching said main valve means in said open position and when in said inoperative position being disengaged from said main valve means and releasing said main valve means for movement to said closed position, said second latch means carried by and pivotally mounted on a portion of said main valve means for ensuring operative engagement or said main valve means with said first latch means upon movement of said main valve means from said closed position to said open position.

2. The overfill prevention device of claim 1, wherein a surface of said main valve means contains a groove therein for receiving said second latch means and wherein said second latch means comprises a planar member and a pin which extends through said planar member and is mounted to opposing sides of said groove.

3. The overfill prevention device of claim 1, wherein said second latch means comprises a planar member and wherein an edge of said planar member is engageable with said first latch means when said main valve means is in said open position.

4. The overfill prevention device of claim 1, wherein said first latch means is coupled to said float means through a bore in said housing and comprises a first seal, adjacent the bore, for preventing the escape of vapors from the tank and through the bore into said passageway.

5. The overfill prevention device of claim 4, wherein said first seal contacts said housing and has an arcuate shaped cross section.

6. The overfill prevention device of claim 1, further comprising a bleed port communicating with said passageway and bleed valve means mounted to said housing and having a normally closed position which blocks said bleed port to thereby prevent the escape of vapors from the interior of the tank to said passageway through said bleed port.

7. The overfill prevention device of claim 6, wherein said bleed valve means is mounted to an exterior of said housing and comprises a second seal which contacts said exterior when said bleed valve means is in the normally closed position.

8. An overfill prevention device adapted to be mounted within a liquid storage tank in fluid communication with piping through which liquid can be introduced into the tank and through which an elongate member can be inserted to measure the level of liquid in the tank, comprising:

an elongate housing having a passageway extending longitudinally therethrough which is adapted to permit insertion of the elongate member into the tank, an inlet adjacent one end of said housing and in communication with said passageway, and a primary outlet adjacent the other end of said housing and in communication with said passageway, said outlet being adapted to be placed in communication with the interior of the tank for passing liquid therethrough from said passageway into the tank, said housing including a float chamber separate from and adjacent said passageway, said float chamber having an inlet adapted to be in fluid communication with the interior of the tank for entry of liquid into said float chamber from the tank so that the level of liquid in said float chamber substantially corresponds to the level of liquid in the tank;

main valve means carried by said housing within said passageway and movable between a normally open position permitting substantially unrestricted flow of liquid through said passageway and insertion of the elongate member through said passageway into the tank and a closed position preventing substantially the flow of liquid through said passageway, said main valve means having biasing means for moving said main valve means from the closed position of the open position when a volume of liquid within said passageway is reduced by a lowering of liquid within the tank, thereby permitting said biasing means to overcome the reduced volume of liquid within said passageway and dispose said main valve means in the open position;

float means mounted within said float chamber for movement along a substantially linear path of travel in response to changes in the level of liquid in said float chamber, said float means normally occupying a first position when there is no liquid in said float chamber and being movable to a second position when the level of liquid in said float chamber rises to a predetermined height indicative of the level of liquid in the tank when the tank is considered substantially full; and deflecting means comprising a plurality of fins mounted on an interior sidewall of said housing which extends longitudinally adjacent said float chamber and opposite said float means for deflecting the elongate member away from said main valve means upon insertion thereof into the tank and preventing contact between the elongate member and said main valve means when said main valve means is in the normally open position.

9. The overfill prevention device of claim 8, further comprising a bleed port communicating with said passageway and bleed valve means mounted to said housing and having a normally closed position which blocks said bleed port to thereby prevent the escape of vapors from the interior of the tank to said passageway through said bleed port.

10. The overfill prevention device of claim 9, wherein said bleed valve means is mounted to an exterior of said housing and comprises a seal which contacts said exterior and surrounds said bleed port when said bleed valve means is in the normally closed position.

11. The overfill prevention device of claim 9, further comprising a valve latch mechanism including first latch means and second latch means cooperatively engageable with said first latch means when said main valve means is in said open position, said first latch means being movable between operative and inoperative positions and responsive to movement of said float means between said first and second positions and when in said operative position being engageable with said main valve means for latching said main valve means in said open position and when in said inoperative position being disengaged from said main valve means and releasing said main valve means for movement to said closed position, said second latch means carried by and pivotally mounted on a portion of said main valve means for ensuring operative engagement of said main valve means with said first latch means upon movement of said main valve means from said closed position to said open position.

12. The overfill prevention device of claim 8, further comprising a valve latch mechanism including first latch means and second latch means cooperatively engageable with said first latch means when said main valve means is in said open position, said first latch means being movable between operative and inoperative positions and responsive to movement of said float means between said first and second positions and when in said operative position being engageable with said main valve means for latching said main valve means in said open position and when in said inoperative position being disengaged from said main valve means and releasing said main valve means for movement to said closed position, said second latch means carried by and pivotally mounted to on a portion of said main valve means for ensuring operative engagement of said main valve means with said first latch means upon movement of said main valve means from said closed position to said open position.

* * * * *